Feb. 3, 1959 MAO CHAO CHEN 2,872,667
MAGNETIC CORE HALF ADDER
Filed May 27, 1957
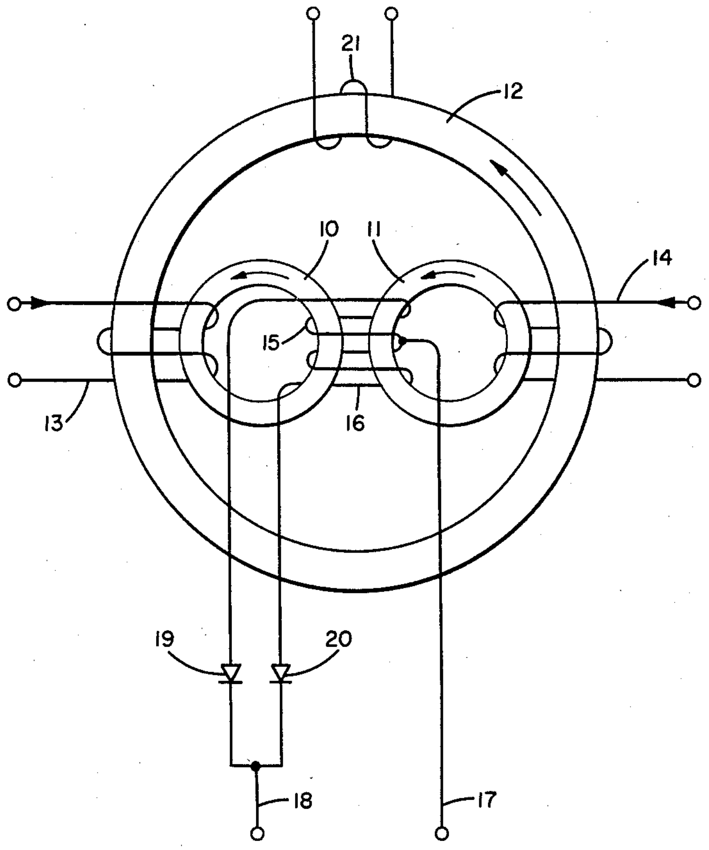
INVENTOR.
MAO CHAO CHEN
BY Francis E Blake
ATTORNEY 2,872,667
Patented Feb. 3, 1959

2,872,667

MAGNETIC CORE HALF ADDER

Mao Chao Chen, Menlo Park, Calif., assignor to General Dynamics Corporation, Rochester, N. Y., a corporation of Delaware Application May 27, 1957, Serial No. 661,861

2 Claims. (Cl. 340—174)

This invention relates to magnetic devices and, more particularly, to magnetic core binary devices for use in computer circuits or the like.

The value of small cores of magnetic material for use as storage and logical elements in electronic data handling systems is now well known. For example, so-called magnetic binary cores may be used to indicate or remember binary conditions, such as represented by the binary bit "1" or the binary bit "0."

The ordinary magnetic binary cores and circuits therefor are now so well known that they need no special description herein. However, for purposes of the present invention, it should be understood that such magnetic binary switching cores are capable of being magnetized to saturation in either of two dirctions. Furthermore, these cores are formed of magnetic material selected to have the so-called square hysteresis loop characteristic which assures that after the core has been saturated in either direction, a definite point of magnetic remanence representing the residual flux density in the core will be retained. The magnetic binary core elements are usually connected in circuits providing one or more input coils and output coils for purposes of switching the core from one binary condition corresponding to a particular direction of saturation to the other binary condition corresponding to the opposite direction of saturation and for indicating when the core switches from one condition of saturation to the other, respectively. The saturation can be achieved by passing a current pulse of sufficient magnitude through the input winding in a manner to create a surge of magnetomotive force in the magnetic core in the sense opposite to the preexisting flux direction, thereby driving the core to saturation in the opposite direction of polarity. When the core switches, a voltage pulse will be induced in other windings on the core, such as, for example, the aforementioned output windings. The magnetic material for the core, as previously mentioned, is preferably one having a generally rectangular hysteresis characteristic and may be formed of various magnetic materials such as those known as "Mumetal," "Permalloy," or the ferromagnetic ferrites such as that known as "Ferramic."

A principal object of the invention is to provide an improved magnetic core binary circut that may be particularly useful in computer circuits or the like.

It is another object of the present invention to provide an improved magnetic core binary arrangement having two input circuits and two output circuits, and which will provide an output signal from only one output circuit when an input signal is applied to only one of either of the two input circuits and will provide an output signal from only the other output circuit when input signals are applied practically simultaneously to both input circuits.

Further objects and features of the invention will be apparent with reference to the following specification and drawing in which is shown the preferred arrangement of the magnetic core binary device.

Referring to the drawing, two small magnetic cores 10 and 11 and a large magnetic core 12 are shown. It will be noted that the small cores 10 and 11 are physically positioned within the large core 12. However, this is just an example of one arrangement of the cores and it should be understood that each of the cores may be spaced from the other provided that the associated windings, to be described, are properly inductively related in the manner set forth. Also, instead of separate magnetic cores 10, 11 and 12, a single core structure arranged to provide the multiple legs corresponding to the small cores 10 and 11 within the large core 12 may be employed. The direction for the original or pre-existing saturation condition of the cores 10, 11 and 12 is shown by the arrows.

A first input coil 13 may be wound upon both the first core 10 and the third core 12 in inductive relation thereto. Similarly, a second input coil 14 may be wound upon both the second core 11 and the third core 12 in inductive relation thereto. Each of the first and second cores 10 and 11 is provided with an output winding 15 and 16, respectively, having equal numbers of turns and connected between terminals 17 and 18 through uni-directional devices 19 and 20 in series opposition to each other. The devices 19 and 20, for example, may be vacuum diodes or crystal diodes and they are usually called rectifiers. Their functions are to allow currents to pass through only in one direction and to be blocked in the opposite direction and, in the present invention, their use, together with coils 15 and 16, enables the output current pulses across terminals 17 and 18 to be uni-directional with a particular polarity only. A second output coil 21 is wound in inductive relation to the third core 12.

The choice of circuit parameters, such as the relative size of the cores 10, 11 and 12, the choice of core materials, the number of turns for the respective input and output windings, and so forth, may be varied to provide that the respective cores may be switched from one direction of saturation to the other direction of saturation upon the application of a predetermined value of magnetomotive force in a selected direction. According to the invention, the circuit parameters are selected to provide that either of the small cores 10 or 11 will switch from one direction of saturation to the other direction of saturation upon the application of a predetermined value of current to either of the respective input coils 13 or 14 for producing a comparable predetermined value of magnetomotive force. Similarly, the parameter for the large core 12 is so chosen that such core will not switch from one direction of saturation to the other unless currents are applied to both of the input coils 13 and 14 substantially simultaneously in an amount to produce sufficient magnetomotive force for simultaneously switching both of the small cores 10 and 11 from one direction of saturation to the other, assuming, of course, that the direction of the applied magnetomotive force is properly poled. However, it will be noted that when currents are applied to both input coils 13 and 14 sufficiently to switch both cores 10 and 11, the simultaneous flux change in cores 10 and 11, being in opposite direction of flux linkage with the respective coils 15 and 16, will not induce a voltage in either of the coils 15 or 16 since the total rate of change of flux linkage within either coil 15 or 16 is zero. On the other hand, when there is only an input voltage to coil 13 or 14 alone, the flux in the respective core 10 or 11 only changes and a voltage is induced in both coils 15 and 16. However, the uni-directional devices 19 and 20 permit the passage of only one of the voltages induced in the coils 15 and 16 since these induced voltages in the coils 15 and 16 are of opposite polarity. The cumulative magnetomotive force applied to the large core 12 when switching signals are applied to both input coils 13 and 14 is, however, sufficient to switch the large core 12 causing an output signal to be induced in the output coil 21 when at the same time, as previously described, no signal is produced across the output terminal 17 and 18.

Reviewing the above, it will be seen that the magnetic binary core switching device of the invention provides selective different output signals indicative of different binary conditions. Namely, when a switching signal is applied to either of the input coils 13 or 14 alone, an output signal will appear across terminals 17 and 18 and no output signal will be induced in output coil 21. When no switching signals are applied to either of the input coils 13 or 14, no signals will appear in either of the output circuits. Also, when switching signals are applied simultaneously to both the input coils 13 and 14, an output signal will appear across the output coil 21 while no output signal will appear across the terminals 17 and 18.

Assuming that a binary bit "1" is represented by a current pulse of a first magnitude of amplitude in the direction shown for input coils 13 and 14, and the binary bit "0" is represented by no current flowing, then an output signal across terminals 17 and 18 may be defined as an output sum and an output signal across the coil 21 may be defined as an output carry, respectively, and the result is binary bit "1" or "0" according to whether or not a voltage signal appears in the output circuits. If we assume L to equal the length of the magnetic path in centimeters for either of the small cores 10 or 11, and 2L to equal the length of the magnetic path in centimeters for the large core 12, and $H_c$ to equal the coercive force in ampere turns per centimeter, and N to equal the number of turns for each of the input windings 13 and 14, then $LH_c$ is the ampere turns necessary to switch either the small cores 10 or 11 and $2LH_c$ is the number of ampturns for switching the large core 12. When using the invention as a binary half adder, the binary requirements are that zero signals be induced in the output coil 21 or across output terminals 17 and 18 when zero signals are applied to the input coils 13 and 14 or that an output signal appear across terminals 17 and 18 and not across the output coil 21 when a binary bit "1" is applied to either input coil 13 or 14 alone or that no output signal appear across terminals 17 and 18 and an output signal appear across coil 21 when a binary bit "1" is substantially simultaneously applied to both input coils 13 and 14. If we choose the magnitude of the input current pulse I representing the binary bit "1" such that $NI=1.5LH_c$, then when only one input winding 13 or 14 is excited by the binary bit, the amp-turn NI is large enough to drive one of the small cores 10 or 11 but is insufficient to drive the large core 12. Therefore, assuming the correct polarity, one of the small cores 10 or 11 will change the direction of saturation but the large core 12 remains unchanged resulting in a single output across the terminals 17 and 18 and no signal output across the coil 21. However, when both input windings 13 and 14 are excited simultaneously by respective binary bit pulses having the predetermined magnitude applied to both inputs, the total driving force available for the large core 12 is then $2NI=3LH_c$, which is large enough to switch the large core 12 so that all three cores 10, 11 and 12 are switched over, assuming the correct polarity. However, as previously pointed out, the toal flux change within the coils 15 and 16 is zero when both cores 10 and 11 switch from one direction of flux saturation to the other substantially simultaneously so that no voltage appears across the output terminals 17 and 18 and, therefore, the binary sum signal equals "0" and the binary carry signal across the output coil 21 equals "1."

To reset the cores 10, 11 and 12 to their original states, it is only necessary to apply a current simultaneously to both input coils 13 and 14 in the opposite direction to that used for the binary registration and of sufficient magnitude to cause all three cores 10, 11 and 12 to switch to their opposite and initial directions of saturation.

Various modifications may be made within the spirit of the invention and the scope of the appended claims.

What is claimed is:

1. A magnetic core binary device comprising, first and second magnetic switching cores requiring a first magnitude of magnetomotive force for switching and a third magnetic switching core requiring a second magnitude of magnetomotive force greater but not more than twice as great as said first magnitude for switching, a first input coil inductively related to said first and third cores, a second input coil inductively related to said second and third coils, first and second output coils each inductively related to both said first and second cores, a third output coil inductively related to said third core, and means connecting the first and second output coils together whereby the application of an input signal magnetomotive force of the first magnitude to only one of said first and second input coils in the direction to switch either said first or second cores will produce an output signal across said first and second output coils and when applied to both of said first and second input coils in the direction to switch said third core will produce an output signal only across said third output coil.

2. A magnetic core binary device comprising, first and second magnetic switching cores requiring a first magnitude of magnetomotive force for switching and a third magnetic switching core requiring a second magnitude of magnetomotive force greater but not more than twice as great as said first magnitude for switching, a first input coil inductively related to said first and third cores, a second input coil inductively related to said second and third coils, first and second output coils each inductively related to both said first and second cores, a third output coil inductively related to said third core, a respective unidirectional conductive device connected in series with each of said first and second output coils, and means connecting the first and second output coils together in series with their respective devices whereby the application of an input signal magnetomotive force of the first magnitude to only one of said first and second input coils in the direction to switch either said first or second core will produce a uni-directional output signal across said means and when applied to both of said first and second input coils in the direction to switch said third core will produce an output signal only across said third output coil.

References Cited in the file of this patent

UNITED STATES PATENTS

| | | |
|---|---|---|
| 2,779,934 | Minnick | Jan. 29, 1957 |
| 2,822,532 | Thompson | Feb. 4, 1958 |